(12) United States Patent
Thompson

(10) Patent No.: US 6,662,624 B1
(45) Date of Patent: Dec. 16, 2003

(54) SHOCK TESTING OF NAVAL VESSELS USING SEISMIC AIRGUN ARRAYS

(75) Inventor: Phillip Rowland Thompson, Glenrothes (GB)

(73) Assignee: Weidlinger Associates Limited, Glenrothes (GB)

( * ) Notice: Subject to any disclaimer, the term of this patent is extended or adjusted under 35 U.S.C. 154(b) by 0 days.

(21) Appl. No.: 09/678,976

(22) Filed: Oct. 5, 2000

(30) Foreign Application Priority Data

Oct. 5, 1999  (GB) .............................................. 9923360

(51) Int. Cl.[7] .................................................. G01M 7/00
(52) U.S. Cl. ...................................................... 73/12.08
(58) Field of Search ............................ 73/12.01, 12.08, 73/12.09; 181/113; 367/16

(56) References Cited

U.S. PATENT DOCUMENTS

| | | | |
|---|---|---|---|
| 3,653,460 A | | 4/1972 | Chelminski |
| 3,979,724 A | * | 9/1976 | Silverman et al. ......... 340/15.5 |
| 4,008,784 A | * | 2/1977 | Bays ............................ 181/114 |
| 4,271,924 A | | 6/1981 | Chelminski |
| 4,712,641 A | * | 12/1987 | Chelminski .................. 181/113 |
| 5,144,588 A | * | 9/1992 | Johnston et al. ............... 367/16 |
| 5,432,757 A | | 7/1995 | Chelminski |

FOREIGN PATENT DOCUMENTS

GB   2203545 A   10/1988

* cited by examiner

*Primary Examiner*—Max Noori
(74) *Attorney, Agent, or Firm*—Clifford W. Browning; Woodard, Emhardt, Moriarty, McNett & Henry LLP

(57) ABSTRACT

Modern warships are designed to withstand the effects of a near miss underwater explosive event. To demonstrate that ship structure and equipment are designed and built to the requisite standard it is common for the entire warship to be shock tested by detonating controlled explosive charges in close proximity to the vessel. By using a partially phased and partially synchronous array of seismic airguns of the type used in oil exploration it is possible to simulate the explosive shock wave and provide a safe, repeatable and more environmentally benign test. The method can be used to provide shock excitation directly onto the keel of a vessel due to the relatively low energy of the airgun discharge bubbles in addition to the more conventional off-beam scenarios. This novel method of shock testing can be applied to ships, submarines, underwater equipment and test models or specimens.

4 Claims, 3 Drawing Sheets

SHOCK TESTING OF NAVAL VESSELS USING SEISMIC AIRGUN ARRAYS

The present invention relates to the field of shock testing for vessels. In particular it relates to a method for testing the ability of vessels to withstand non-contact underwater explosions.

The ability to withstand the effects of non-contact underwater explosions (UNDEX) is an important aspect of the design of modern warships. To demonstrate that a warship structure and equipment are designed and built to the required standard, it is common for the entire warship to be shock tested by detonating controlled explosive charges in close proximity to the vessel. The resulting response of the vessel, its equipment and any ensuing damage is then monitored.

However, shock testing of a vessel can be costly. It requires the use of explosively licensed ranges and can tie up the warship for a significant period due to the transit time to the range and the time spent once there.

Further, the fact it is an operation involving explosives, carries with it significant safety implications both for the trials teams and the vessel under test.

It is an object of the present invention to provide a method and apparatus for underwater shock testing which is safer than current techniques. Furthermore, the present invention aims to provide a technique that does not require a vessel to be transported to a range and which can be rapidly carried out, with a short turnaround time between tests.

Further objects include providing a technique that is more environmentally acceptable than those involving the use of explosives and less likely to damage the vessel being studied. This would allow new types of test. For instance, tests configured directly below a warship's keel cannot currently be carried out as conventional techniques would cause damage.

According to the present invention, there is provided a method of shock testing ships, submarines, underwater equipment and/or model specimens in which an array of synchronised and phased seismic airguns is used to provide a shock wave which simulates the shock wave produced by an underwater explosive.

Preferably, the characteristics of an explosive shock wave are matched with a compound shock pulse from several guns, specifically matching peak pressure, decay constant and energy flux density.

The shock testing of the ship may take place immediately below the keel of the ship, submarine, underwater equipment and/or model specimen.

Most preferably, the release of high pressure air simulates an explosive shock wave.

The method of shock testing may be as herein described and illustrated in the accompanying drawings.

According to a second aspect of the present invention, there is provided apparatus for shock testing ships, submarines underwater equipment and/or model specimens comprising an array of synchronised and phased seismic airguns which produces a shock wave which simulates the shock wave produced by an underwater explosive.

Preferably, the characteristics of an explosive shock wave are matched with a compound shock pulse from several guns, specifically matching peak pressure, decay constant and energy flux density.

The array of synchronised and phased seismic airguns may be positioned immediately below the keel of the ship, submarine, underwater equipment and/or model specimen.

Most preferably, the release of high pressure air simulates an explosive shock wave.

Preferably, there is provided a method whereby an impulsive load may be supplied to a vessel, ship, model or specimen to simulate operational loadings such as slamming.

Preferably, there is provided a method whereby a dynamic broadband excitation may be applied to modally characterise the structure and determine transfer functions from the fluid domain to parts, structures, equipment and systems within the ship, submarine or vessel.

The apparatus may be as herein described and illustrated in the accompanying drawings.

An example embodiment of the present invention will now be described with reference to following FIGS. in which.

The method described here, and the devices associated with it, define a novel method of underwater shock testing of ships, submarines, underwater equipment and models. It is based on replacing the explosive source with one based on an array of seismic survey airguns, more commonly used in the offshore oil industry for seismic surveying operations. By removing the explosive elements of the shock test and replacing the source with a safer, more repeatable device the following advantages may be realised:

- the operation is inherently safer than using explosives, requiring only standard precautions relating to systems under pressure (typically 2000 psi for airguns)
- the low source strength and absence of explosives mean that shock testing can be carried out in virtually any location, even while the vessel is berthed, provided there is sufficient depth of water
- there are no chemical by-products
- a faster turnaround time between tests can be achieved by removing the necessary logistics required to handle explosives
- the airgun bubble energies are significantly smaller than those of explosive events and hence there is virtually no risk of bubble induced whipping of the hull girder
- the small bubble energies preclude any damage to the ship hull by either bubble jetting or collapse
- the lower bubble energy associated with the gun array enables tests to be configured directly below the vessel keel.

Figure 1:
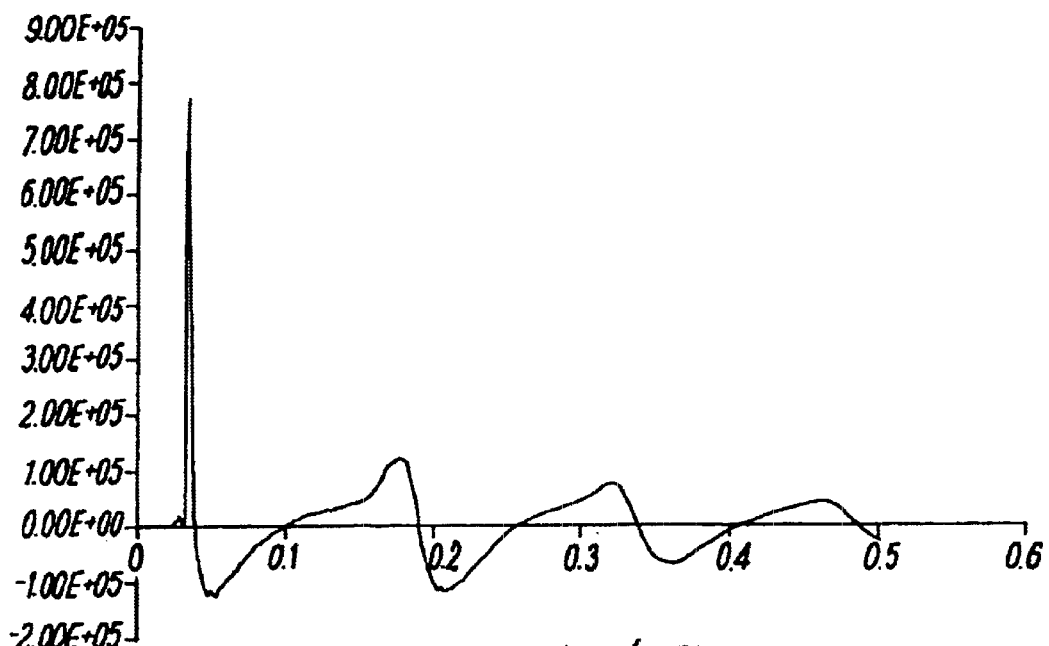
FIG. 1 is a plot of pressure in Pascals (y-axis) versus time in seconds (x-axis) of a typical airgun output from three 250 cu-in seismic airguns.

Seismic airguns are essentially high pressure chambers of compressed air which, by the action of a fast actuating solenoid valve, rapidly release the pressure in the chambers, causing an transient acoustic wave to propagate into the surrounding water. FIG. 1 shows a plot of pressure (y-axis) in Pa as a function of time (x-axis) in secs for a typical array of three 250 cubic inch airguns at a distance of 3 m. The shock wave from a single large airgun however, is of lower magnitude and of longer duration than typical explosive pressure profiles. Therefore, to simulate an explosive pressure pulse, this method uses an array of smaller airguns within which, some are synchronised, and some have phase delays. In this way, the acoustic output from several airguns can be superposed to provide a synthetic, compound pressure profile which is more representative of explosive shock waves.

Control over the amplitude of the compound pulse is achieved by using a mixture of gun types (GB2203545A refers), operating pressures and depths of firing. Generally, smaller, lower amplitude, guns with small pulse widths provide finer detail in the compound pulse, while the majority of the energy is derived from several large gun sizes within the array. The amplitudes can be further tuned by alteration of individual gun operating pressures or by using established methods of gun design s to achieve more controlled pulse shaping (U.S. Pat. No. 4,271,924A, U.S. Pat. No. 3,653,460A and U.S. Pat. No. 5,432,757A are examples)

Figure 2:
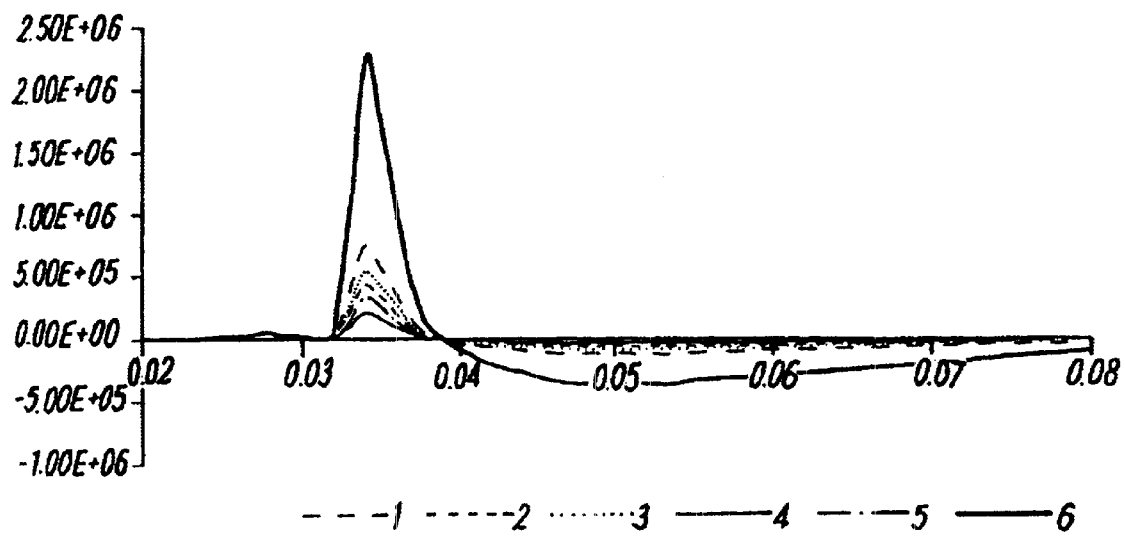
FIG. 2 is a plot of pressure in Pascals (y-axis) versus time in seconds (x-axis) of multiple airgun outputs summed into a single compound pulse.

FIG. 2 shows a similar plot of pressure (y-axis) in Pa as a function of time (x-axis) in secs for an array of seven clusters of three 250 cu-in guns but of slightly differing relative phase and magnitude (1 to 5). When superposed, the gun pulses add to produce the compound pulse (6) shown.

By using larger airguns the number of guns which need to be deployed can be reduced. Despite the fact that a larger number of guns are being deployed than would normally be expected in offshore applications, the demands on air supply are not onerous. In shock testing there is a long cycle time between shots and there will be no repeated firing. Thus air supply requirements for single infrequent shots are very modest as compared to the repeated firings used offshore.

While peak pressure in the compound pulse can be increased by adding more guns to the array in phase, it is clearly not possible, by adding more pressure pulses, to obtain a smaller pulse width in the compound pulse than that of the pulses from which it is composed. As a consequence the method is more successful at simulating large charges at a distance where shock wave durations are longer or where the explosive event is non-conventional, in simulations of either tapered charge or scaled underwater nuclear events.

The damage potential of a non-contact underwater explosion for a typical warship is directly related to the energy flux density that the explosive shock wave imposes on the wetted boundary of the vessel. Thus the primary selection mechanism for determining the shape of the compound pressure pulse is energy flux density. Secondary to this, the matching of the peak pressure and the decay constant is used. The decay constant, commonly denoted by θ, is the time taken for the explosive peak pressure, approximated by an exponential function, to decay to 1/e of its peak amplitude where e is the exponential operator. These criteria may be different where the item or vessel under test is more susceptible to damage related to the imposed peak pressure as opposed to the total energy flux density. In such cases the airgun array output will be primarily matched to peak pressure of the desired explosive shock wave and will be matched to energy flux as a secondary consideration.

Figure 3:
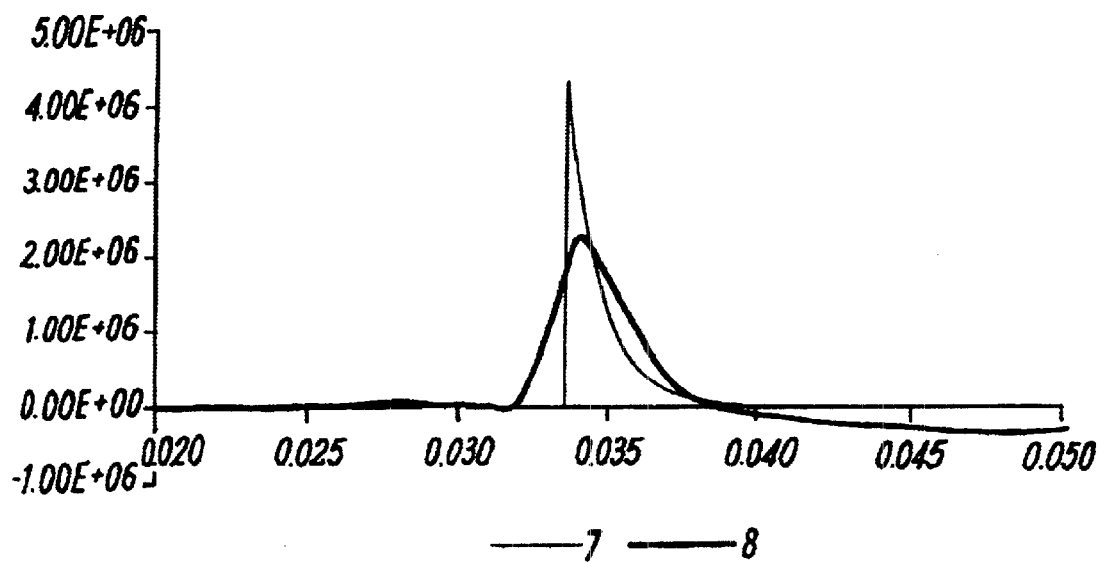
FIG. 3 is a plot of pressure in Pascals (y-axis) versus time in seconds (x-axis) comparing airgun pulse pressure time history with the pressure resulting from 450 kg TNT at 70 meters.
Figure 4:
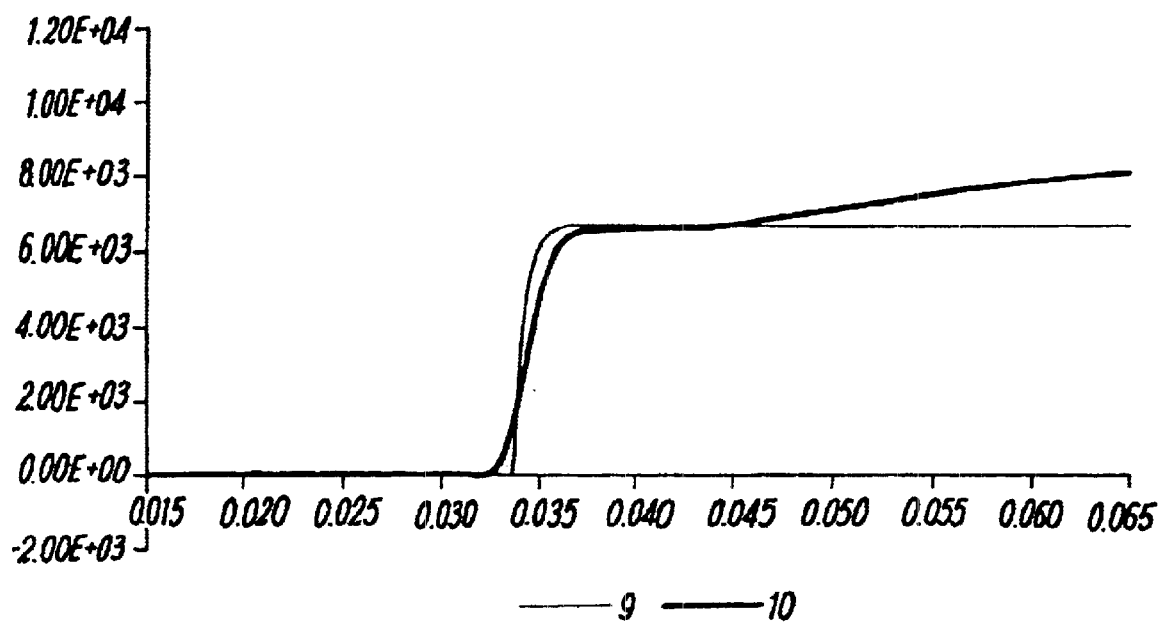
FIG. 4 is a plot of pressure in Pascals (y-axis) versus time in seconds (x-axis) comparing compound airgun pulse energy flux density with the energy flux density resulting from 450 kg TNT at 70 meters.

As an example, FIG. 3 and FIG. 4 show comparisons of pressure-time and energy flux-time respectively, for a compound pressure pulse derived from an airgun array and an explosive attack scenario. In this case, a generic charge size 450 kg of TNT is considered at a nominal stand-off of 70 m. In FIG. 3, pressure (y-axis) in Pa is plotted as a function of time (x-axis) in secs for the explosive case (7) and the array output (8). The important comparison however is shown in FIG. 4 where energy flux density (y-axis) in $Jm^{-2}$ is plotted as a function of time (x-axis) in secs again for the explosive case (9) and the array output (10). In this figure it is seen that the total energy flux can be simulated well although some compromise is made on the rise-time to peak.

The practical implementation of this method uses a bespoke software utility which takes data from all the gun types available, all possible operating pressures and phase delays and compares the resulting compound pulse with a desired explosive pulse shape by evaluating an error function. An optimisation process then minimises the error between the two to determine the optimum test configuration and gun settings.

Figure 5:
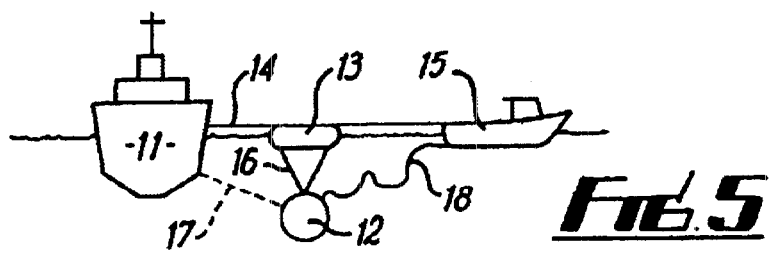
FIG. 5 is a sectional view of a typical configuration for abeam shock testing of a vessel using an airgun array.
Figure 6:
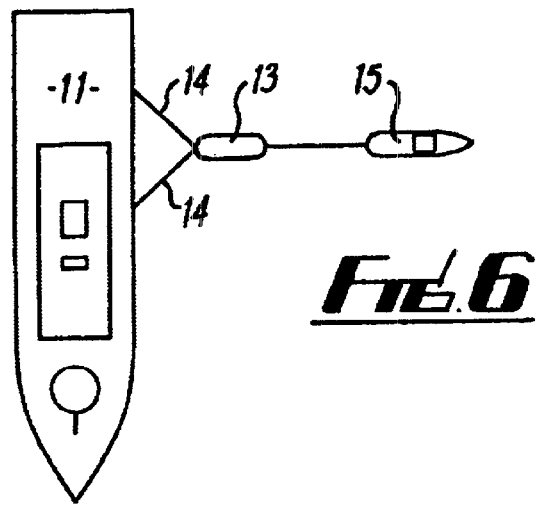
FIG. 6 is a plan view of a typical configuration for abeam shock testing of a vessel using an airgun array.

A configuration for shock testing abeam of a vessel is shown in sectional and plan view in FIG. 5 and FIG. 6 respectively. In this case the vessel under test (11) is moored or anchored in a suitable location. The guns of the airgun array are selected based on the desired explosive pulse which the test is trying to emulate and using the iterative procedure outlined above. The airgun array is attached to a robust steel frame that is intended to take several sizes and designs of airguns (12). This frame is necessarily robust and the shock loading imposed by the guns on themselves and neighbouring guns within the array demands that the fixings are high integrity and will not shake loose under repeated excitation.

The airgun array is suspended below a catamaran float (13) which is attached to the hull of the vessel using one or more steel cables (14) acting as bridles in the horizontal plane. In the configuration shown two bridles are used. The steel cables are fixed to the ship hull by holding devices which may be studs, magnetic devices, suction devices or eyelets which are bonded with a removal adhesive to the hull. The catamaran is hauled off from the vessel by a launch (15) to maintain the correct horizontal stand-off distance. The airgun array depth below the catamaran float is defined by fixed length steel cables (16) or may be set to a variable depth by suspending the array from a splash-proof winch located on the catamaran and controlled from a support vessel. The depth of the gun array, when considered with the horizontal stand-off distance, defines the direct standoff (or slant distance) (17) to the nearest point on the vessel or specimen under test. The airgun array is energised by a pressurised air supply and each individual airgun actuation mechanism is controlled through an umbilical cable (18) from a support vessel to the airgun array.

Figure 7:
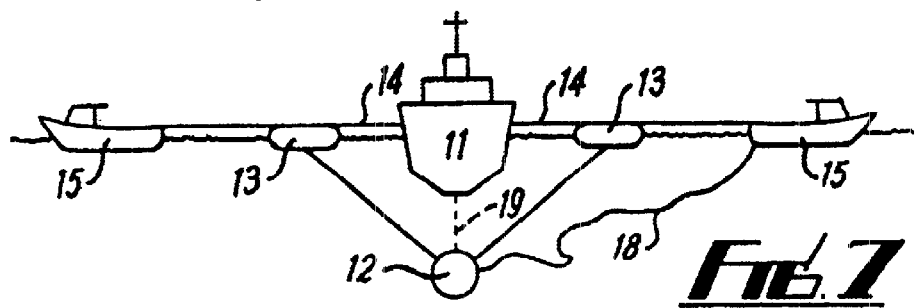
FIG. 7 is a sectional view of a typical configuration for under-keel shock testing of a vessel using an airgun array.
Figure 8:
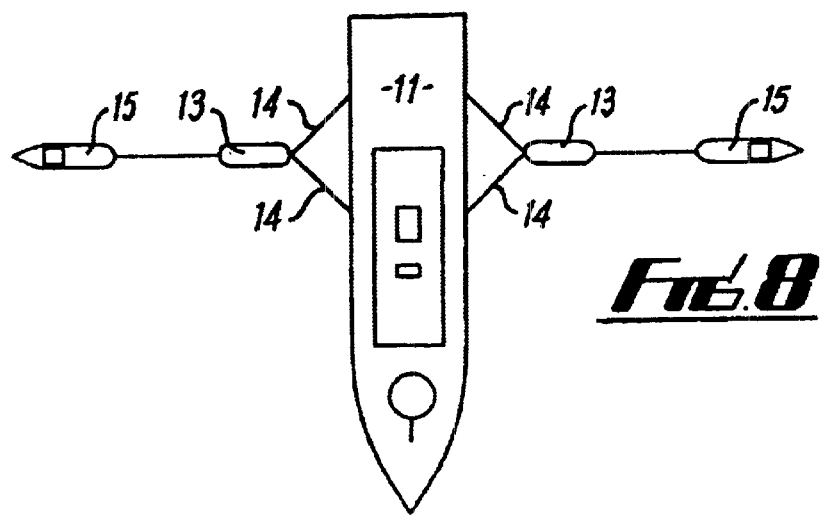
FIG. 8 is a plan view of a typical configuration for under-keel shock testing abeam of a vessel using an airgun array.

For under-keel testing a symmetric arrangement is employed using a similar method, This is illustrated in FIG. 7 and FIG. 8. In this case, two launches (15) tension the two catamaran floats and horizontal stand-off bridles at the same axial location on either side of the vessel. The horizontal stand-off distance and the length of the array suspension cables thus define the depth of the airgun array below the keel of the vessel (19) and hence the shock loading level imposed on the ship hull.

In all testing configurations, surface pressure gauges may be attached to the keel of the vessel by a diver, prior to deployment, to provide information on the impinging pressure and hence the actual stand-off distance attained in any test. This instrumentation would be combined with free-field gauges which are deployed to confirm that the desired gun pressure profile has been achieved and the test has been performed to the desired severity level.

For shock testing of submarines, subsurface structures and underwater equipment, test configurations similar to those described in FIGS. 5 to 8 can be employed but the most efficient method of achieving this is dependent on the depth at which the shock test of the vessel will take place.

The method described here also defines the process whereby a general dynamic or impulsive load may be applied to a ship structure, submarine or vessel for the purpose of simulating ship slamming responses dynamically or for exciting structural modes for the purpose of modal characterisation of the vessel.

Further, the method may be applied to the determination of structural transfer functions from the fluid domain through the ship or submarine hull to systems, equipment and structures within the hull.

Further modifications and improvements may be incorporated without departing from the scope of the invention herein intended.

What is claimed is:

1. A method of shock testing ships, submarines, underwater equipment or model specimens comprising the steps providing an array of air guns with the guns being focused toward the ships, submarines, underwater equipment or model specimens;

firing a number of the air guns in the array to produce a compound pressure pulse with some of the air guns in the array being fired in a synchronised manner and others being fired asynchronously over time;

focusing and directing the compound pressure pulse toward the ships, submarines, underwater equipment or model specimens; and monitoring the response of the ships, submarines, underwater equipment or model specimens and any associated equipment using monitoring equipment that measures specific reactions of the ships, submarines, underwater equipment or model specimens.

2. A method as in claim 1 wherein the compound pressure pulse matches the characteristics of an explosive shock by matching one or more characteristics selected from the group consisting of peak pressure, decay constant and energy flux density.

3. Apparatus for shock testing ships, submarines, underwater equipment or model specimens, comprising a plurality of airguns; and a software module that initiates the firing of the air guns such that some fire synchronously and some fire asynchronously over time to produce a compound pressure pulse that matches the characteristic of an explosive shock.

4. Apparatus as in claim 3 wherein the compound pressure pulse matches the characteristics of an explosive shock by matching one or more characteristics selected from the group consisting of peak pressure, decay constant and energy flux density.

* * * * *